US010347950B2

(12) United States Patent
Takahata et al.

(10) Patent No.: US 10,347,950 B2
(45) Date of Patent: Jul. 9, 2019

(54) SEALED NONAQUEOUS ELECTROLYTE SECONDARY BATTERY

(71) Applicant: TOYOTA JIDOSHA KABUSHIKI KAISHA, Toyota-shi, Aichi (JP)

(72) Inventors: Koji Takahata, Toyota (JP); Akihiro Ochiai, Kadoma (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/379,610

(22) PCT Filed: Jan. 29, 2013

(86) PCT No.: PCT/JP2013/051891
§ 371 (c)(1),
(2) Date: Aug. 19, 2014

(87) PCT Pub. No.: WO2013/125305
PCT Pub. Date: Aug. 29, 2013

(65) Prior Publication Data
US 2015/0010784 A1    Jan. 8, 2015

(30) Foreign Application Priority Data
Feb. 23, 2012    (JP) .................................. 2012-037967

(51) Int. Cl.
*H01M 10/0525*    (2010.01)
*H01M 10/42*    (2006.01)
(Continued)

(52) U.S. Cl.
CPC ....... *H01M 10/4235* (2013.01); *H01M 2/345* (2013.01); *H01M 4/366* (2013.01);
(Continued)

(58) Field of Classification Search
CPC combination set(s) only.
See application file for complete search history.

(56) References Cited

U.S. PATENT DOCUMENTS 5,776,627 A * 7/1998 Mao .................. H01M 10/0567
429/324
6,632,572 B1    10/2003 Takahashi al.
(Continued)

FOREIGN PATENT DOCUMENTS

CN    1279520 A    10/2001
CN    1430306 A    7/2003
(Continued)

OTHER PUBLICATIONS

Office Action issued in U.S. Appl. No. 14/690,815 dated May 18, 2018.
(Continued)

*Primary Examiner* — Jeremiah R Smith
(74) *Attorney, Agent, or Firm* — Finnegan, Henderson, Farabow, Garrett & Dunner, LLP

(57) ABSTRACT

The present invention provides a sealed nonaqueous electrolyte secondary battery which is equipped with a current interrupt device that is actuated by a rise in internal pressure of a battery case and in which the current interrupt device is actuated in a speedy and stable manner during an overcharge. In the sealed nonaqueous electrolyte secondary battery, an electrode body formed by a positive electrode 10 and a negative electrode that oppose each other via a separator, an electrolyte, and an overcharge inhibitor are housed in the battery case. The positive electrode 10 includes a positive electrode current collector 12 and a positive electrode active material layer 14 which is formed on the current collector and which mainly contains a positive electrode active material. In addition, a conductive material layer 16 which mainly contains a conductive material is
(Continued)

formed between the positive electrode active material layer 14 and the separator. A porosity of the conductive material layer 16 is 35% or more and 55% or less.

10 Claims, 7 Drawing Sheets

(51) Int. Cl.
*H01M 10/0567* (2010.01)
*H01M 2/34* (2006.01)
*H01M 10/052* (2010.01)
*H01M 4/36* (2006.01)
*H01M 4/62* (2006.01)
H01M 4/88 (2006.01)
H01M 4/86 (2006.01)
H01M 10/0587 (2010.01)
H01M 4/02 (2006.01)

(52) U.S. Cl.
CPC ......... *H01M 4/625* (2013.01); *H01M 10/052* (2013.01); *H01M 10/0525* (2013.01); *H01M 10/0567* (2013.01); *H01M 4/8657* (2013.01); *H01M 4/8889* (2013.01); *H01M 10/0587* (2013.01); *H01M 2004/021* (2013.01); *H01M 2220/20* (2013.01); *H01M 2300/0017* (2013.01); *Y02E 60/122* (2013.01); *Y02T 10/7011* (2013.01)

(56) References Cited

U.S. PATENT DOCUMENTS

| | | | | |
|---|---|---|---|---|
| RE43,276 E * | 3/2012 | Kweon | | 423/463 |
| 9,559,383 B2 | 1/2017 | Morita et al. | | |
| 9,876,227 B2 | 1/2018 | Oyama et al. | | |
| 2002/0028380 A1* | 3/2002 | Tanjo | | H01M 4/131 |
| | | | | 429/209 |
| 2003/0118912 A1 | 6/2003 | Watanabe et al. | | |
| 2007/0026312 A1* | 2/2007 | Imachi | | H01M 4/0404 |
| | | | | 429/217 |
| 2007/0048607 A1 | 3/2007 | Nakashima et al. | | |
| 2008/0318133 A1* | 12/2008 | Matsuyama | | H01M 4/13 |
| | | | | 429/300 |
| 2009/0130561 A1* | 5/2009 | Matsumoto | | C01B 31/04 |
| | | | | 429/231.8 |
| 2010/0143773 A1* | 6/2010 | Honbou | | H01M 2/1077 |
| | | | | 429/94 |
| 2010/0310944 A1 | 12/2010 | Kang et al. | | |
| 2011/0311679 A1 | 12/2011 | Yamada et al. | | |
| 2012/0064390 A1* | 3/2012 | Wang | | H01M 10/0567 |
| | | | | 429/163 |
| 2012/0208070 A1* | 8/2012 | Nakashima | | H01M 2/1646 |
| | | | | 429/158 |

FOREIGN PATENT DOCUMENTS

| | | | |
|---|---|---|---|
| CN | 101529642 A | 9/2009 | |
| EP | 1 065 744 | 1/2001 | |
| EP | 2 469 624 A1 | 6/2012 | |
| JP | 2002-117895 | * 4/2002 | ............ H01M 10/40 |
| JP | 2002-151055 | 5/2002 | |
| JP | 2002-313415 A | 10/2002 | |
| JP | 2003-338277 | 11/2003 | |
| JP | 2003-338317 A | 11/2003 | |
| JP | 2004-063114 A | 2/2004 | |
| JP | 2005-259680 A | 9/2005 | |
| JP | 2006-324235 | 11/2006 | |
| JP | 2008-97879 | 4/2008 | |
| JP | 2009-206105 A | 9/2009 | |
| JP | 2010-507213 A | 3/2010 | |
| JP | 2010-160984 | 7/2010 | |
| JP | 2013-84400 | 5/2013 | |
| JP | 2013-235653 A | 11/2013 | |
| KR | 10-2001-0007570 | 1/2001 | |
| KR | 10-0509968 B1 | 8/2005 | |
| WO | WO 2011/021644 A1 | 2/2011 | |

OTHER PUBLICATIONS

Office Action issued in U.S. Appl. No. 14/690,815 dated Jan. 26, 2018.
Office Action issued in U.S. Appl. No. 14/690,815 dated May 15, 2017.
Office Action issued in U.S. Appl. No. 14/690,815 dated Jan. 18, 2017.
Notice of Allowance issued in U.S. Appl. No. 14/690,815 dated Aug. 31, 2018.
Notice of Allowance issued in U.S. Appl. No. 14/690,815 dated Jan. 8, 2019.

* cited by examiner

[FIG. 1]
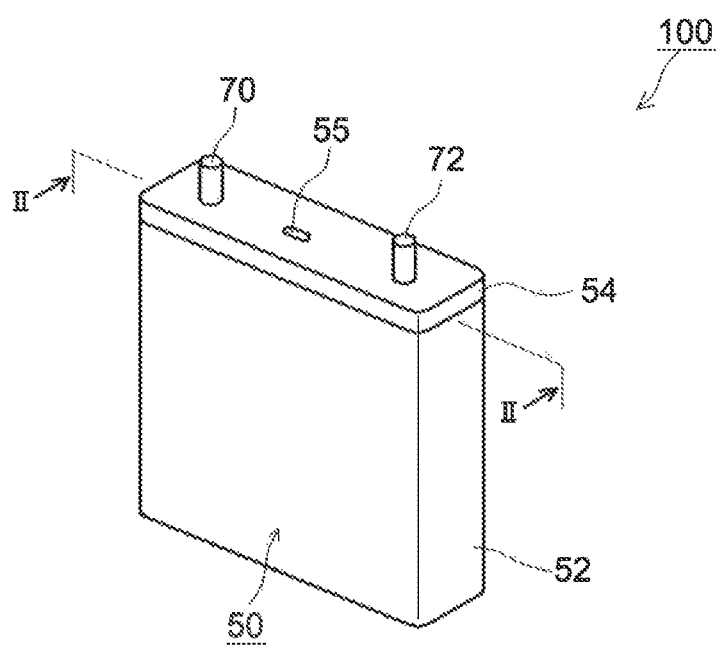

[FIG. 2]
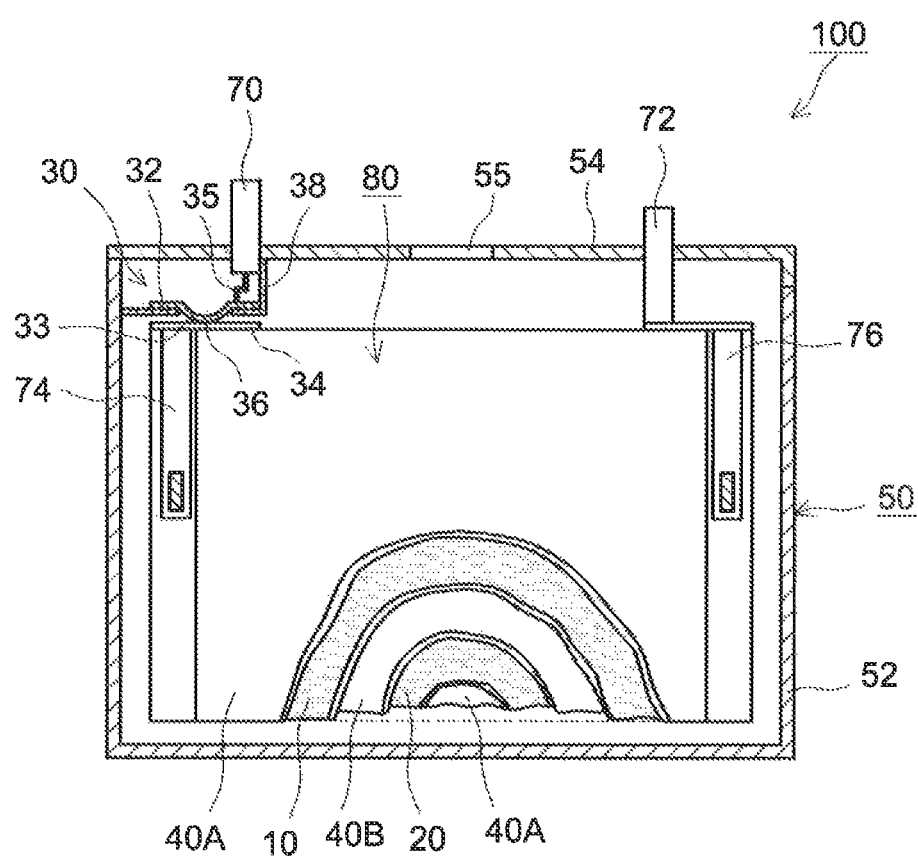

[FIG. 3]
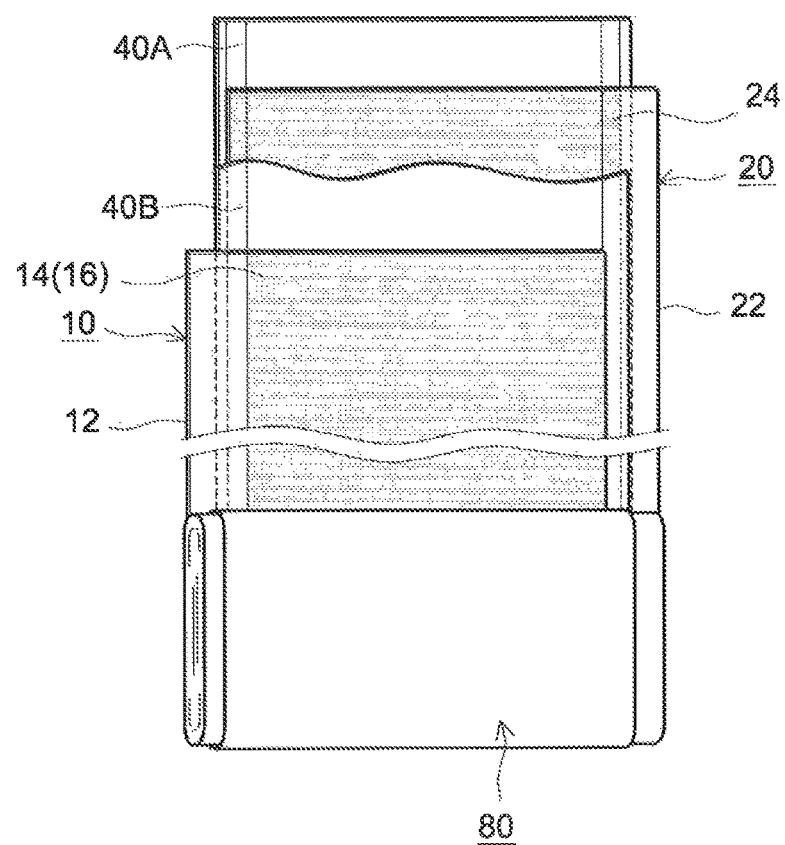

[FIG. 4A]
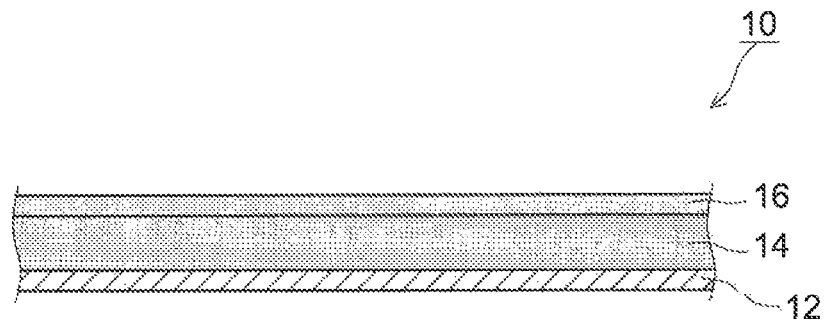

[FIG. 4B]
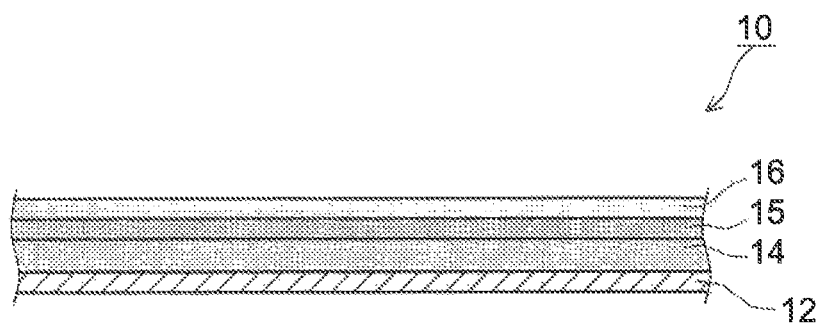

[FIG. 5]
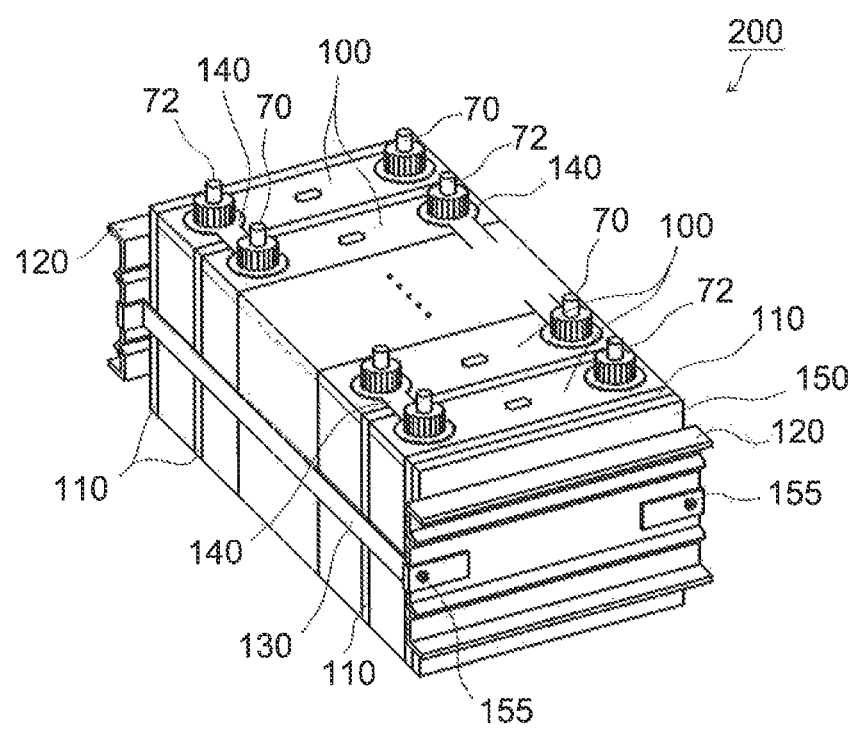

[FIG. 6]
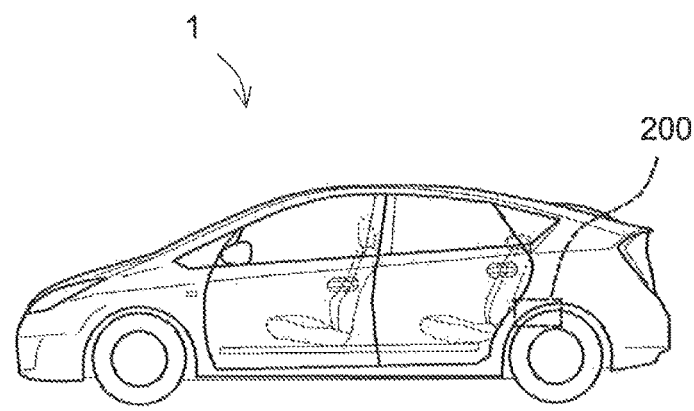
[FIG. 7]
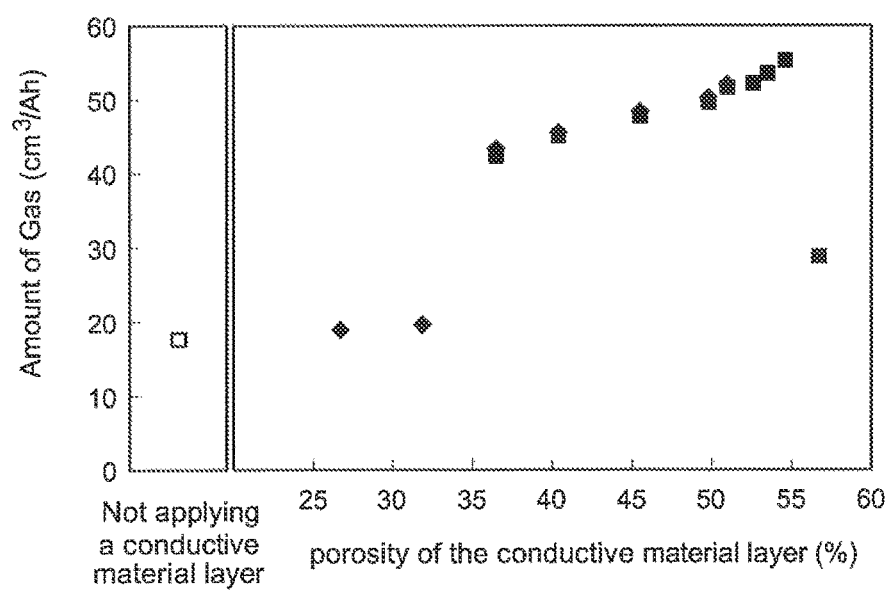

SEALED NONAQUEOUS ELECTROLYTE SECONDARY BATTERY

TECHNICAL FIELD

The present invention relates to a nonaqueous electrolyte secondary battery. More specifically, the present invention relates to a sealed nonaqueous electrolyte secondary battery equipped with a current interrupt device that is actuated by a rise in internal pressure.

The present application is a national phase application of international application no. PCT/JP2013/051891, and claims priority on the basis of Japanese Patent Application No. 2012-037967 filed in Japan on Feb. 23, 2012, the entire contents of both of which are incorporated herein by reference.

BACKGROUND ART

Lithium-ion secondary batteries and other secondary batteries feature smaller size, lighter weight, higher energy density, and more superior output density than existing batteries. Therefore, such secondary batteries have been favorably used as so-called portable power supplies of personal computers, mobile terminals, and the like and as vehicle driving power supplies.

Examples of modes of such batteries include a sealed nonaqueous electrolyte secondary battery. A sealed nonaqueous electrolyte secondary battery is typically constructed by housing an electrode body constituted by positive and negative electrodes having active material layers that contain active materials in a battery case together with an electrolyte (typically, electrolyte liquid), and mounting a lid body to seal the battery case.

While a sealed nonaqueous electrolyte secondary battery is generally used in a state where voltage is controlled so as to be within a prescribed range (for example, 3.0 V or higher and 4.2 V or lower), overcharge may sometimes occur when a current that is larger than normal is supplied to the battery due to a misoperation or the like and voltage exceeds a prescribed voltage. In consideration thereof, a current interrupt device (CID) is widely used which interrupts a charge current when pressure inside a battery case equals or exceeds prescribed pressure and stops progress of overcharge. Generally, when a battery enters an overcharged state, an electrolyte (typically, a nonaqueous solvent) or the like is electrolyzed and gas is generated. The current interrupt device is configured so as to be capable of preventing further overcharge by interrupting a charging path of the battery based on the generation of gas.

When using the current interrupt device described above, a method is known in which a compound with a lower oxidation potential than an electrolyte (in other words, a compound with a lower start voltage of an oxidation decomposition reaction than the electrolyte: hereinafter sometimes referred to as an "overcharge inhibitor") is included in the electrolyte in advance. Once the battery enters an overcharged state, the overcharge inhibitor is rapidly oxidized and decomposed on a surface of a positive electrode and hydrogen ions ($H^+$) are created. As the hydrogen ions spread through the electrolyte and are reduced upon reaching a negative electrode, hydrogen gas is generated. Since pressure inside the battery case rises due to the generated hydrogen gas, the current interrupt device can be actuated more rapidly. For example, Patent Literature 1 discloses that cyclohexylbenzene (CHB) and biphenyl (BP) can be used as the overcharge inhibitor.

CITATION LIST

Patent Literature

Patent Literature 1: Japanese Patent Application No. 2006-324235
Patent Literature 2: Japanese Patent Application No. 2003-338277

SUMMARY OF INVENTION

However, a radical intermediate of the overcharge inhibitor is generated together with the hydrogen ions at the positive electrode and may form a polymer on the positive electrode. Accordingly, when a polymerized film is formed on the surface of a positive electrode active material, resistance of the positive electrode increases and may potentially suppress a subsequent oxidation decomposition reaction of the overcharge inhibitor. In addition, even if hydrogen ions are generated by the oxidation decomposition reaction, movement of the hydrogen ions may be suppressed by the polymerized film. In this case, the rate of gas generation during an overcharge may decline or an amount of generated gas may decrease. For example, with a large-size (or large capacity) battery that is used as a vehicle driving power supply, since the spatial volume inside the battery is large, a large amount of gas (for example, 40 $cm^3$/Ah or more) is required to increase pressure inside a battery case. However, if the rate of gas generation declines or the amount of generated gas decreases due to reasons such as those described above, the pressure inside the battery case cannot rise rapidly and may retard actuation of the current interrupt device.

The present invention has been made in consideration of the above, and an object thereof is to provide a sealed nonaqueous electrolyte secondary battery which is equipped with a current interrupt device that is actuated by a rise in internal pressure of a battery case and in which the current interrupt device is actuated in a speedy and stable manner during an overcharge.

In order to achieve the object described above, a sealed nonaqueous electrolyte secondary battery is provided in which an electrode body having a positive electrode and a negative electrode that oppose each other via a separator, an electrolyte, and an additive (an overcharge inhibitor) made of a compound that generates gas when a prescribed battery voltage is exceeded are housed in a battery case, this sealed nonaqueous electrolyte secondary battery including a current interrupt device that is actuated when pressure inside the battery case rises as a result of generation of the gas. The positive electrode includes a positive electrode current collector and a positive electrode active material layer which is formed on the positive electrode current collector and which mainly contains a positive electrode active material. A conductive material layer which mainly contains a conductive material is further provided between the positive electrode active material layer and the separator. In addition, the conductive material layer has a porosity of 35% or higher and 55% or lower.

Unlike conventional configurations, by providing the conductive material layer between a positive electrode active material layer and a separator (typically, an outermost surface of a positive electrode), even when a polymerized film originated from an overcharge inhibitor is formed on a surface of the positive electrode active material layer (typically, on a positive electrode active material), the overcharge inhibitor can be preferably oxidized and decomposed by the conductive material layer. In particular, since preferable gaps are maintained inside the conductive material layer whose porosity is within the range described earlier, an electrolyte (typically, electrolyte liquid) and an overcharge inhibitor can sufficiently infiltrate the conductive material layer. Therefore, the overcharge inhibitor can be rapidly decomposed during an overcharge and hydrogen ions can be generated. In addition, since a migration path of the generated hydrogen ions is preferably secured in the conductive material layer, gas can be generated in a stable manner in a desired volume (for example, 40 cm$^3$/Ah or more, favorably 45 cm$^3$/Ah or more, and more favorably 50 cm$^3$/Ah or more). Accordingly, pressure inside the battery case rises sufficiently and the current interrupt device can be actuated more accurately. Therefore, according to the sealed nonaqueous electrolyte secondary battery disclosed herein, the current interrupt device can be actuated more rapidly and more stably as compared to conventional configurations and a highly reliable battery can be realized.

Meanwhile, Patent Literature 2 describes a lithium-ion secondary battery in which a thin film constituted by a conductive carbon material and a binder is formed on a surface of a positive electrode active material layer. However, the described prior art is intended to prevent a physical short-circuit of a battery and to reduce gas that is generated during storage of the battery. Therefore, an object (technical idea) of Patent Literature 2 is completely opposite to that of the present invention and differs therefrom in the intended use of the conductive carbon material, preferable types, and the like. In addition, no disclosures nor suggestions whatsoever with respect to a current interrupt device and an overcharge inhibitor which are constituent features of the present invention are made in Patent Literature 2 and, as will be demonstrated by the examples to be described later, the techniques described in Patent Literature 2 are incapable of independently achieving the object of the present application.

In a preferable mode of the sealed nonaqueous electrolyte secondary battery disclosed herein, the positive electrode has a two-layered structure including the positive electrode active material layer that is formed on the positive electrode current collector and the conductive material layer that is formed on a surface of at least a part of the positive electrode active material layer.

A sealed nonaqueous electrolyte secondary battery having a positive electrode with the two-layered structure described above achieves both the effect of the present invention (to actuate a current interrupt device in a speedy and stable manner) and superior battery performance (for example, high energy density) at a high level.

In a preferable mode of the sealed nonaqueous electrolyte secondary battery disclosed herein, a specific surface area of the conductive material as measured by a nitrogen gas adsorption method is 1 m$^2$/g or more and 30 m$^2$/g or less (typically, 2 m$^2$/g or more and 10 m$^2$/g or less).

When the specific surface area of the conductive material is within the range described above, more preferable gaps can be maintained in the conductive material layer. Therefore, the electrolyte can readily infiltrate into the conductive material layer and the effect of the present invention can be produced at an even higher level.

A preferable mode of the sealed nonaqueous electrolyte secondary battery disclosed herein at least includes graphite as the conductive material.

Since graphite exhibits high reactivity, an oxidation decomposition reaction (in other words, gas generation) of the overcharge inhibitor can be further promoted. In addition, since the degree of graphitization (orientation of a hexagonal net structure) is higher than other conductive materials, problems such as swelling of the battery due to generation of gas that is unrelated to battery reaction can be reduced. Furthermore, since volume density is relatively low, battery capacity (energy density) per unit volume can be effectively maintained. Therefore, both the effect of the present invention and superior battery performance can be achieved at an even higher level.

A preferable mode of the sealed nonaqueous electrolyte secondary battery disclosed herein includes cyclohexylbenzene and/or biphenyl as the additive.

An oxidation potential (vs. Li/Li$^+$) of cyclohexylbenzene and biphenyl is around 4.5 V to 4.6 V. Therefore, for example, with a battery having an upper-limit charge voltage of around 4.1 V to 4.2 V, oxidation and decomposition proceeds rapidly during an overcharge and hydrogen gas can be generated. As a result, the current interrupt device can be rapidly actuated.

In a preferable mode of the sealed nonaqueous electrolyte secondary battery disclosed herein, the sealed nonaqueous electrolyte secondary battery contains the additive at an amount of 0.5% by mass or more and 5% by mass or less (for example, 1% by mass or more and 4% by mass or less) with respect to 1000/by mass of the electrolyte.

With the technique disclosed herein, since reaction efficiency of the overcharge inhibitor is high, a desired amount of gas can be produced in a stable manner using a smaller amount of the additive as compared to conventional cases. Therefore, the additive amount of the overcharge inhibitor can be reduced and both the effect of the present invention and superior battery performance can be achieved at an even higher level.

In addition, the present invention provides an assembled battery which combines a plurality of the sealed nonaqueous electrolyte secondary battery disclosed herein or a plurality of a sealed nonaqueous electrolyte secondary battery manufactured according to a manufacturing method disclosed herein.

The sealed nonaqueous electrolyte secondary battery disclosed herein is higher in reliability than conventional batteries. Therefore, the battery can preferably be used in an assembled battery that is constructed by connecting a plurality of the batteries in series and/or in parallel.

In addition, the present invention provides a vehicle equipped with the assembled battery as a driving power supply.

While the sealed nonaqueous electrolyte secondary battery disclosed herein can be used in various applications, a feature of the sealed nonaqueous electrolyte secondary battery is that both high reliability and superior battery performance are achieved at high levels. Therefore, the sealed nonaqueous electrolyte secondary battery can be preferably used in applications that require high energy density and high output density. Examples of such applications include a power source (a driving power supply) for motor drive which is mounted to a vehicle (typically, a plug-in hybrid vehicle (PHV), a hybrid vehicle (HV), or an electric vehicle (EV)).

BRIEF DESCRIPTION OF DRAWINGS

FIG. 1 is a perspective view schematically showing an external shape of a sealed nonaqueous electrolyte secondary battery according to an embodiment of the present invention;

FIG. 2 is a diagram schematically showing a cross-sectional structure along line II-II of the sealed nonaqueous electrolyte secondary battery shown in FIG. 1;

FIG. 3 is a schematic diagram showing a configuration of a wound electrode body of a sealed nonaqueous electrolyte secondary battery according to an embodiment of the present invention;

FIG. 4A is a sectional view schematically showing a configuration of a positive electrode having a two-layered structure according to an embodiment of the present invention;

FIG. 4B is a sectional view schematically showing a configuration of a positive electrode having a three-layered structure according to an embodiment of the present invention;

FIG. 5 is a perspective view schematically showing an assembled battery that combines a plurality of sealed nonaqueous electrolyte secondary batteries (cells) according to an embodiment of the present invention;

FIG. 6 is a side view showing a vehicle (automobile) including an assembled battery according to an embodiment of the present invention; and FIG. 7 is a graph showing a relationship between porosity (%) of a conductive material layer and gas generation volume ($cm^3$/Ah) during an overcharge.

DESCRIPTION OF EMBODIMENTS

In the present specification, a "nonaqueous electrolyte secondary battery" refers to a battery including a nonaqueous electrolyte (typically, an electrolyte in which a supporting electrolyte is contained in a nonaqueous solvent). Generally, a secondary battery that is referred to as a lithium battery, a lithium polymer battery, a lithium ion capacitor, or the like is a secondary battery which uses lithium ions as electrolyte ions and which realizes charge and discharge by migration of charges accompanying the lithium ions between a positive electrode and a negative electrode. A typical example is the nonaqueous electrolyte secondary battery according to the present specification. In addition, in the present specification, an "active material" refers to a substance (compound) capable of reversibly absorbing and desorbing a chemical species that acts as a charge carrier (for example, lithium ions or sodium ions; lithium ions in the case of a lithium battery) at the positive electrode or the negative electrode.

Moreover, in the present specification, an "overcharged state" refers to a state where a charge depth (SOC: state of charge) exceeds 100%. In this case, SOC indicates a state of charge in a range of an operating voltage capable of reversible charge and discharge when a state of charge at which an upper limit voltage is produced (in other words, a fully charged state) is assumed to be 100% and a state of charge at which a lower limit voltage is produced (in other words, an uncharged state) is assumed to be 0%.

Furthermore, in the present specification, "porosity" refers to a ratio (%) of gaps in a conductive material layer (or an active material layer). Specifically, for example, "porosity" refers to a value calculated according to Expression (1) below using a mass W (g) of a conductive material layer, an apparent volume V ($cm^3$) of the conductive material layer, and a true density ρ (a value obtained by dividing the mass W by an actual volume excluding gaps) of the conductive material layer as measured by a density measuring device according to a general constant volume dilatometric method (gas displacement pycnometry). The "apparent volume" described above can be calculated as a product of an area S ($cm^2$) in plan view and a thickness T (cm). The "area S ($cm^2$) in plan view" can be obtained by, for example, cutting out in a square or rectangle using a punching machine, a cutter, or the like. The "thickness T" can be measured using, for example, a micrometer or a thickness gauge (for example, a rotary caliper meter).

$$(1-W/\rho V) \times 100 \tag{1}$$

Hereinafter, a preferable embodiment of the sealed nonaqueous electrolyte secondary battery disclosed herein will be described with reference to the drawings as appropriate. With the exception of matters specifically mentioned in the present specification, matters required to carry out the present invention can be understood to be design matters of a person with ordinary skill in the art based on the prior art in the relevant technical field. A sealed nonaqueous electrolyte secondary battery structured as such can be implemented based on the contents disclosed in the present specification and on common general technical knowledge in the relevant field. Moreover, while a case of a lithium-ion secondary battery will sometimes be described in detail below as a typical example, such descriptions are not intended to limit an object of application of the present invention to a lithium-ion secondary battery. It should be noted that, in the following drawings, members and portions that produce the same effects will be described using the same reference characters and overlapping descriptions may sometimes be omitted or simplified. It should also be noted that dimensional relationships (length, width, thickness, and the like) shown in the respective drawings do not reflect actual dimensional relationships.

A typical configuration of a positive electrode of the sealed nonaqueous electrolyte secondary battery disclosed herein will be described with reference to FIGS. 4A and 4B. FIGS. 4A and 4B are schematic diagrams showing a preferable configuration of a positive electrode 10 of the sealed nonaqueous electrolyte secondary battery disclosed herein. FIG. 4A shows a case of a two-layered structure and FIG. 4B shows a case of a three-layered structure.

The positive electrode 10 shown in FIG. 4A includes a positive electrode current collector 12, a positive electrode active material layer 14 which is formed on the current collector and which mainly contains a positive electrode active material, and a conductive material layer 16 which is formed at least closer to a surface of the positive electrode 10 than the positive electrode active material layer and which mainly contains a conductive material. With a positive electrode having the two-layered structure described above, resistance (for example, contact resistance between the positive electrode active material layer 14 and the conductive material layer 16) can be kept relatively low. Therefore, a sealed nonaqueous electrolyte secondary battery having such a positive electrode can achieve both reliability and battery performance at a high level. In addition, the positive electrode 10 shown in FIG. 4B further includes another layer (intermediate layer) 15 between the positive electrode active material layer 14 and the conductive material layer 16. A composition or the like of the intermediate layer 15 is not particularly limited and, for example, the intermediate layer 15 may be of the same type as the positive electrode active material layer 14 or the conductive material layer 16. Moreover, while only examples with two layers (FIG. 4A) and three layers (FIG. 4B) have been presented, the positive electrode 10 is not limited to such examples and can have a laminated structure constituted by four or more layers.

According to the technique disclosed herein, a position where the conductive material layer 16 is provided need only be between the positive electrode active material layer 14 and a separator (to be described later). For example, the conductive material layer 16 may be provided on a surface of the separator instead of on a surface of the positive electrode 10 (a surface of the positive electrode active material layer 14). In this case, a positive electrode 10 can be used in which only a positive electrode active material layer 14 mainly containing a positive electrode active material is formed on the positive electrode current collector 12 (in other words, a positive electrode 10 with a structure in which the conductive material layer 16 is not formed on the positive electrode active material layer 14). In addition, in the present specification, a "layer" is a term simply used to distinguish a part of a thickness direction from other parts. Therefore, a clear division need not necessarily be microscopically and/or macroscopically visible and, for example, cases where a distinction can only be made through physical or chemical analysis are also included.

While a method of fabricating the positive electrode 10 is not particularly limited, for example, a positive electrode configured as shown in FIG. 4A can be fabricated as follows. First, a positive electrode active material is mixed in a suitable solvent together with a conductive material, a binder, and the like to prepare a slurry-like (including paste-like and ink-like: the same description applies hereinafter) composition (hereinafter, referred to as a "positive electrode active material slurry"), and the slurry is applied on the positive electrode current collector 12 to form the positive electrode active material layer 14. Next, a conductive material is mixed in a suitable solvent together with a binder or the like to prepare a slurry-like composition (hereinafter, referred to as a "positive electrode conductive material slurry"), and the slurry is applied on the positive electrode active material layer 14 to form the conductive material layer 16. In this manner, the positive electrode 10 including the positive electrode active material layer 14 and the conductive material layer 16 on the positive electrode current collector 12 can be fabricated.

As a method of preparing the positive electrode active material slurry and the positive electrode conductive material slurry (hereinafter, the positive electrode active material slurry and the positive electrode conductive material slurry may sometimes be collectively referred to as a "positive electrode mixture slurry"), conventional and known kneading methods (for example, a roll mill or a mixer) can be used as appropriate. In addition, the materials (for example, the positive electrode active material, the conductive material, and the binder) may be added to the solvent and kneaded at the same time or may be added to the solvent and kneaded in several stages. Although not particularly limited, a solid content concentration (NV) of the positive electrode mixture slurry can be set to 50% by mass to 75% by mass (favorably, to 55% by mass to 65% by mass and, more favorably, to 55% by mass to 60% by mass). In addition, as a method of applying the positive electrode mixture slurry, a conventional and known coating device (for example, a slit coater, a die coater, a comma coater, or a gravure coater) can be used as appropriate.

As the positive electrode current collector 12, a conductive member made of a metal with favorable conductivity (for example, aluminum, nickel, titanium, stainless steel, or an alloy or the like including these metals as main components) can be favorably used. Since a shape of the current collector may differ according to a shape or the like of a battery to be constructed and is therefore not particularly limited, a rod like body, a plate like body, a foil like body, a net like body, or the like can be used. With a battery provided with a wound electrode body (to be described later), a foil like body is mainly used. Although a thickness of a foil like current collector is not particularly limited, a foil like current collector with a thickness of around 5 μm to 50 μm (more favorably, 8 μm to 30 μm) can be favorably used in consideration of a balance between capacity density of the battery and strength of the current collector.

As the positive electrode active material, one or two or more substances conventionally used in a nonaqueous electrolyte secondary battery can be used without any particular limitation. Examples include: oxides that contain lithium and a transition metal element as structural metal elements (lithium-containing transition metal oxides) such as lithium-nickel oxide ($LiNiO_2$), lithium-cobalt oxide ($LiCoO_2$), and lithium-manganese oxide ($LiMn_2O_4$); and phosphates that contain lithium and a transition metal element as structural metal elements such as lithium manganese phosphate ($LiMnPO_4$) and lithium iron phosphate ($LiFePO_4$). In particular, a positive electrode active material that includes a lithium-nickel-cobalt-manganese complex oxide (for example, $LiNi_{1/3}Co_{1/3}Mn_{1/3}O_2$) with a layered structure containing lithium, nickel, cobalt, and manganese as structural elements (typically, a positive electrode active material that is substantially constituted by a lithium-nickel-cobalt-manganese complex oxide) can be favorably used due to superior thermal stability and high energy density.

Although not particularly limited, a ratio of the positive electrode active material among the entire positive electrode active material layer 14 is favorably 50% by mass or more (typically, 70% by mass or more and less than 100%; for example, 80% by mass or more and 99% by mass or less). Moreover, the positive electrode active material can also be contained in the conductive material layer as long as the effect of the present invention is not significantly impaired. In this case, the ratio of the positive electrode active material among the entire conductive material layer can be set to 50% by mass or less (typically to 30% by mass or less; for example, 20% by mass or less, favorably 10% by mass or less, and more favorably 5% by mass or less).

In this case, the term "lithium-nickel-cobalt-manganese complex oxide" is used so as to include oxides containing Li, Ni, Co, and Mn as constituent metal elements as well as oxides containing at least one metal element other than Li, Ni, Co, and Mn (a transition metal element and/or a representative metal element other than Li, Ni, Co, and Mn). The metal element may be, for example, one, two or more elements among magnesium (Mg), calcium (Ca), strontium (Sr), titanium (Ti), zirconium (Zr), vanadium (V), niobium (Nb), chromium (Cr), molybdenum (Mo), tungsten (W), Iron (Fe), rhodium (Rh), palladium (Pb), platinum (Pt), copper (Cu), zinc (Zn), boron (B), aluminum (Al), gallium (Ga), indium (In), tin (Sn), lanthanum (La), and cerium (Ce). The same description applies to the terms "lithium-nickel oxide", "lithium-cobalt oxide", and "lithium-manganese oxide". While an amount of a structural element (substituent element) other than Li, Ni, Co, and Mn is not particularly limited, for example, the amount of the structural element may be set to 0.1% by mass or more (typically, 0.2% by mass or more; for example, 0.3% by mass or more) and 5% by mass or less (typically, 3% by mass or less; for example, 2.5% by mass or less) with respect to a total of 1000/by mass of Ni, Co, Mn, and the substituent element.

As such a lithium transition metal oxide, for example, a lithium transition metal oxide powder prepared by a conventionally known method may be used without modification. Although an average particle diameter of the powder is not particularly limited, for example, the average particle diameter can be set to 1 μm or more and 25 μm or less (typically, 2 μm or more and 20 μm or less; for example, 6 μm or more and 15 μm or less). Moreover, in the present specification, the term "average particle diameter" refers to an average particle diameter (also called a $D_{50}$ particle diameter or a median diameter) equivalent to cumulative 50% from a particulate side in a volume-based particle size distribution as obtained by a particle size distribution measurement based on a general laser diffraction/light scattering method.

As the conductive material, one or two or more substances conventionally used in a nonaqueous electrolyte secondary battery can be used without any particular limitation. For example, the conductive material may be one, two or more materials selected from amorphous carbon such as graphite, non-graphitizable carbon (hard carbon), and graphitizable carbon (soft carbon) and carbon material such as carbon fiber and nano-carbon. More specifically, examples include natural graphite and modified materials thereof, artificial graphite, carbon black (for example, acetylene black, furnace black, Ketjen black, channel black, lamp black, and thermal black), coke, carbon fiber (PAN carbon fiber, pitch carbon fiber), activated charcoal, carbon nanotubes, fullerene, and graphene. Alternatively, a metal fiber (for example, Al fiber or stainless steel (SUS) fiber), a conductive metal powder (for example, metal powder of Ag, Ni, or Cu), a metal oxide (for example, ZnO or $SnO_2$), a synthetic fiber whose surface is coated with metal, and the like can be used.

Properties of the conductive material used in the positive electrode active material layer 14 are not particularly limited. However, generally, since the smaller an average particle diameter of primary particles, the greater the specific surface area to increase a contact area with the positive electrode active material, a conductive material whose primary particles have a smaller average particle diameter is advantageous for maintaining a conductive path inside the positive electrode active material layer 14. On the other hand, since a conductive material with a large specific surface area tends to have a greater volume, there is a risk that energy density may decline. For these reasons, an average particle diameter of primary particles that make up the conductive material used in the positive electrode active material layer 14 is favorably within a range of approximately 1 nm to 200 nm (typically, approximately 10 nm to 100 nm; for example, approximately 30 nm to 50 nm). Moreover, in the present specification, a "particle diameter of primary particles" refers to an arithmetic average value of particle diameters obtained by observing at least 30 or more (for example, 30 to 100) primary particles in a photograph taken by an electron microscope (although any of a scanning electron microscope or a transmission electron microscope can be used, favorably, a transmission electron microscope). In addition, a specific surface area of the conductive material used in the positive electrode active material layer 14 is favorably within a range of 25 $m^2$/g to 1000 $m^2$/g (typically, 50 $m^2$/g to 500 $m^2$/g; for example, 50 $m^2$/g to 200 $m^2$/g and, more favorably, 50 $m^2$/g to 100 $m^2$/g). Moreover, in the present specification, "a specific surface area" refers to a specific surface area value (a BET specific surface area) as measured according to a constant capacity adsorption method using nitrogen gas by a general specific surface area measuring device (for example, "BELSORP (registered trademark)-18 PLUS) manufactured by BEL Japan, Inc. Examples of conductive materials having such properties include carbon black (typically, acetylene black or Ketjen black).

Although not particularly limited, a ratio of the conductive material among the entire positive electrode active material layer 14 can be set to, for example, 0.1% by mass or more and 15% by mass or less (typically, 1% by mass or more and 10% by mass or less).

While properties of the conductive material used in the conductive material layer 16 are not particularly limited, for example, a conductive material with an average particle diameter of 30 μm or less (typically, 20 μm or less and favorably 5 μm or more and 15 μm or less) can be favorably used. In addition, for example, a conductive material with a specific surface area of 1 $m^2$/g or more (typically, 2 $m^2$/g or more) and 30 $m^2$/g or less (typically, 10 $m^2$/g or less) can be favorably used. Furthermore, for example, a conductive material with a tap density of 0.01 $g/cm^3$ or more (typically, 0.05 $g/cm^3$ or more) and 1.0 $g/cm^3$ or less (typically, 0.8 $g/cm^3$ or less; for example, 0.5 $g/cm^3$ or less) can be favorably used. Moreover, in the present specification, a "tap density" refers to a value measured according to a method defined in JIS K1469 using a general tapping density measurement device (for example, model "TPM-3" manufactured by Tsutsui Scientific Instruments Co., Ltd.).

A conductive material satisfying one, two or more properties described above is capable of maintaining suitable gaps inside the conductive material layer 16 and causing sufficient infiltration of a nonaqueous electrolyte and an overcharge inhibitor into the conductive material layer. Furthermore, since volume density is relatively low, such a conductive material is also preferable from the perspective of maintaining battery capacity (energy density) per unit volume.

When a carbon material is used as the conductive material for the conductive material layer 16, a degree of graphitization of the carbon material as expressed by, for example, a lattice spacing d (002) measured by a general X-ray diffraction (XRD) device is favorably 0.335 nm or more (typically, 0.337 nm or more; for example, 0.338 nm or more) and 0.340 nm or less. In addition, for example, in a Raman spectrum as measured by general laser Raman spectroscopy, a ratio ($I_D/I_G$; R value) between an intensity $I_D$ of a Raman band (D peak) near 1360 $cm^{-1}$ and an intensity $I_G$ of a Raman band (G peak) near 1580 $cm^{-1}$ is favorably set to 0.2 or more (typically, 0.3 or more; for example, 0.4 or more) and 0.7 or less (typically, 0.6 or less).

Since a conductive material satisfying one or more (favorably, two) of the degrees of graphitization described above (d(0002) and R value) has a high degree of graphitization and superior conductivity, an oxidation decomposition reaction (in other words, gas generation) of an overcharge inhibitor can be further promoted. Therefore, during an overcharge, a large amount of gas can be generated more rapidly and a current interrupt device can be actuated in a precise manner. In addition, the use of a conductive material satisfying the degrees of graphitization described above enables generation of gas during normal use to be suppressed and problems attributable to such generation of gas during normal use (for example, battery swelling) to be reduced.

An example of a conductive material that satisfies many of the preferable ranges of the properties described above (in other words, the average particle diameter, the specific surface area, the tap density, the lattice spacing, and the R value described above) is graphite. Graphite has a layered configuration in which carbon atoms with a hexagonal net structure are laminated on top of one another, and since an end portion (edge surface) of the layered structure exhibits superior reactivity, graphite can be favorably used in the technique disclosed herein. A type of graphite is not particularly limited and graphite that is conventionally used in a nonaqueous electrolyte secondary battery can be used as appropriate. For example, the graphite may be one, two or more types selected from natural graphite (also called black lead) that is collected from natural minerals, artificial graphite that is manufactured from oil-based or coal-based material, and graphite subjected to processing such as pulverization or pressing. More specifically, examples include scaly graphite, scale-like (lumpy) graphite, earthy graphite, expanded graphite, and pyrolytic graphite.

A shape of the conductive material (typically, graphite) may be a scale-like shape (including thin polygonal pieces and thin elliptical pieces (flakes)), a needle-like shape, a spherical shape, a granular shape, and the like. In the technique disclosed herein, a conductive material with a scale-like shape having particularly high orientation (in other words, high conductivity) can be favorably used. The shape can be determined by observing at least 30 or more (for example, 30 to 100) graphite particles using a general scanning electron microscope (SEM).

Moreover, in the present specification, a "scale-like shape" is a term used to distinguish a shape from a "spherical shape". Typically, a "scale-like shape" refers to a particle with a thin piece shape and having shape anisotropy, and is not limited to shapes resembling a fish scale. For example, a "scale-like shape" refers to a particle whose ratio (A/B) between a length of a longest side (A) and a length of a shortest side (B: typically, thickness) is 2 or more (favorably, 10 or more) and 1000 or less (typically, 500 or less and, favorably, 100 or less).

Although not particularly limited, a ratio of the conductive material among the entire conductive material layer 16 is favorably 50% by mass or more (typically, 70% by mass or more and 100% by mass or less; for example, 80% by mass or more and 100% by mass or less).

As the binder, one, two or more compounds which are capable of uniformly dissolving or dispersing in the solvent described earlier and which are conventionally used in a nonaqueous electrolyte secondary battery can be used without any particular limitation. For example, when a positive electrode active material layer is formed using an organic solvent based liquid composition (an organic solvent based composition having an organic solvent as a main component of a dispersion medium), a polymer material that disperses or dissolves in the organic solvent can be favorably adopted. Examples of such a polymer material include polyvinylidene fluoride (PVdF), polyvinylidene chloride (PVdC), and polyethylene oxide (PEO).

Alternatively, when the positive electrode active material layer is formed using a water based liquid composition, a polymer material that disperses or dissolves in water can be favorably adopted. Examples of polymer materials that dissolve in water (water-soluble) include: a cellulose based polymer such as carboxymethyl cellulose (CMC), methyl cellulose (MC), cellulose acetate phthalate (CAP), and hydroxypropyl methyl cellulose (HPMC); an acrylic polymer such as polyvinyl alcohol (PVA) and polymethyl methacrylate (PMMA); and a urethane-based polymer such as polyurethane. In addition, examples of polymer material that disperses in water (water-dispersible) include: vinyl based polymers such as polyethylene (PE) and polypropylene (PP); ethylene based polymers such as polyethylene oxide (PEO) and polytetrafluoroethylene (PTFE); fluorine-based resins such as tetrafluoroethylene-hexafluoropropylene copolymer (FEP) and tetrafluoroethylene-perfluoroalkyl vinyl ether copolymer (PFA); vinyl acetate copolymers; and rubbers such as styrene-butadiene rubber (SBR) and acrylic acid-modified SBR resin (SBR based latex).

While a ratio of the binder among the entire positive electrode active material layer 14 or the entire conductive material layer 16 may be appropriately selected according to a positive electrode active material or a conductive material (type and amount), for example, the ratio can be set to 0.1% by mass or more and 10% by mass or less (favorably, 1% by mass or more and 5% by mass or less).

As the solvent, one or two or more solvents conventionally used when constructing a nonaqueous electrolyte secondary battery can be used without any particular limitation. Such solvents can be roughly divided into water based solvents and organic solvents. Examples of organic solvents include amide based solvents, alcohol based solvents, ketone based solvents, ester based solvents, amine based solvents, ether based solvents, nitrile based solvents, cyclic ether based solvents, and aromatic hydrocarbon based solvents. More specifically, examples include N-methyl-2-pyrrolidone (NMP), N,N-dimethylformamide, N,N-dimethylacetamide, 2-propanol, ethanol, methanol, acetone, methyl ethyl ketone, methyl propenoate, cyclohexanone, methyl acetate, ethyl acetate, butyl acetate, methyl acrylate, diethyl triamine, N,N-dimethylaminopropylamine, acetonitrile, ethylene oxide, tetrahydrofuran, dioxane, benzene, toluene, ethylbenzene, xylene dimethyl sulfoxide, dichloromethane, trichloromethane, and dichloroethane. Typically, NMP can be used. In addition, as the water based solvent, water or a mixed solvent having water as a main component is favorable. As a solvent other than water which constitutes such a mixed solvent, one or two or more organic solvents (lower alcohol, lower ketone, or the like) which can be homogeneously mixed with water can be appropriately selected and used. For example, a water based solvent containing 80% by mass or more (more favorably, 90% by mass or more, and even more favorably 95% by mass or more) of water is favorably used. A particularly favorable example, is a water based solvent substantially constituted by water (for example, water).

With respect to the positive electrode mixture slurry prepared herein, various additives (for example, an inorganic compound capable of generating gas during an overcharge or a material capable of functioning as a dispersant) can be added as long as the effect of the present invention is not impaired. Examples of an inorganic compound capable of generating gas during an overcharge include carbonates (for example, lithium carbonate), oxalates (for example, lithium oxalate), and nitrates. In addition, examples of the dispersant described above include: high molecular compounds having a hydrophobic chain and a hydrophilic group (for example, an alkali salt and typically a sodium salt); an anionic compound having a sulfate, a sulfonate, a phosphate, or the like; and a cationic compound such as amine. More specifically, examples include carboxymethyl cellulose (CMC), methyl cellulose, ethyl cellulose, hydroxypropyl cellulose, butyral, polyvinyl alcohol, modified polyvinyl alcohol, polyethylene oxide, polyvinyl pyrrolidone, polycarboxylic acid, oxidized starch, and starch phosphate.

With the positive electrode 10 disclosed herein, after applying the positive electrode mixture slurry (typically, after applying the positive electrode active material slurry on the positive electrode current collector 12 and forming the positive electrode active material layer 14 and after applying the positive electrode conductive material slurry on the positive electrode active material layer and forming the conductive material layer 16), the applied positive electrode mixture slurry is dried using suitable drying means. As a drying method, natural drying and drying by hot air, low humidity air, a vacuum, infrared rays, far infrared rays, and electron beams may be used singly or combined. Subsequently, by performing a pressing process on the positive electrode after drying, a thickness and density of the positive electrode active material layer 14 and/or the conductive material layer 16 can be adjusted. For the pressing process, for example, various conventional and known pressing methods such as a roll pressing method or a plate pressing method can be adopted. Moreover, for example, the pressing process may only be performed after forming the positive electrode active material layer 14 or may be performed after forming both the positive electrode active material layer 14 and the conductive material layer 16.

According to the technique disclosed herein, a porosity of the conductive material layer 16 after the pressing process described above is 35% or more and typically 35% or more and 55% or less (favorably, 50% or more and 55% or less). With the conductive material layer 16 that satisfies the porosity range described above, since preferable gaps are maintained in the conductive material layer and an electrolyte and an overcharge inhibitor sufficiently infiltrate the conductive material layer, the overcharge inhibitor can be preferably decomposed during an overcharge. In addition, even when a polymerized film is formed on the surface of the positive electrode due to oxidation and decomposition of the overcharge inhibitor, an oxidation decomposition reaction of the overcharge inhibitor in the conductive material layer can be performed in a stable manner and a desired amount of gas can be generated. Furthermore, since pressure inside the battery case rises steadily due to the produced gas, the current interrupt device can be actuated in a precise manner. Therefore, the sealed nonaqueous electrolyte secondary battery disclosed herein is capable of actuating the current interrupt device more rapidly and stably and achieves improved reliability as compared to conventional sealed nonaqueous electrolyte secondary batteries.

While a density of the positive electrode active material layer 14 after the pressing process is not particularly limited, for example, the density may be set to 2.0 g/cm$^3$ or more (typically, 2.5 g/cm$^3$ or more) and 4.5 g/cm$^3$ or less (typically, 4.0 g/cm$^3$ or less; for example, 3.8 g/cm$^3$ or less). In addition, while a density of the conductive material layer 16 after the pressing process is not particularly limited, for example, the density may be set to 1.1 g/cm$^3$ or more (typically, 1.2 g/cm$^3$ or more; for example, 1.3 g/cm$^3$ or more) and 1.5 g/cm$^3$ or less (typically, 1.49 g/cm$^3$ or less).

Next, a negative electrode of the sealed nonaqueous electrolyte secondary battery disclosed herein includes a negative electrode current collector and a negative electrode active material layer which is formed on the negative electrode current collector and which mainly contains a negative electrode active material. While a method of fabricating the negative electrode is not particularly limited, a method can be adopted in which a negative electrode active material is mixed in a suitable solvent together with a binder and the like to prepare a slurry-like composition (hereinafter, referred to as a "negative electrode active material slurry"), and the slurry is applied on the negative electrode active material current collector to form the negative electrode active material layer. As a method of forming a negative electrode active material layer, methods similar to the case of the positive electrode described earlier can be adopted as appropriate.

As the negative electrode current collector, a conductive member made of a metal with favorable conductivity (for example, copper, aluminum, nickel, titanium, stainless steel, or an alloy or the like including these metals as main components) can be favorably used. A shape of the negative electrode current collector may be the same as the shape of the positive electrode current collector.

As the negative electrode active material, one or two or more substances conventionally used in a nonaqueous electrolyte secondary battery can be used without any particular limitation. For example, a carbon material such as that exemplified as the conductive material for the positive electrode (the positive electrode active material layer 14 or the conductive material layer 16) can be used. In addition, other examples that can be used include: metal oxides such as silicon oxide (for example, SiO or $SiO_2$), titanium oxide (for example, TiO or $TiO_2$), vanadium oxide (for example, $VO_2$ or $V_2O_5$), iron oxide (for example, FeO, $Fe_2O_3$, or $Fe_3O_4$), cobalt oxide (for example, CoO or, $Co_2O_3$), nickel oxide (for example, NiO), niobium oxide (for example, $Nb_2O_5$), tin oxide (for example, SnO or $SnO_2$), lithium-silicon composite oxide, lithium-titanium composite oxide, lithium-vanadium composite oxide, lithium-manganese composite oxide, and lithium-tin composite oxide; metal nitrides such as lithium nitride ($Li_3N$), lithium-cobalt composite nitride, and lithium-nickel composite nitride; and alloys of silicon and lithium (for example, $Li_{4.4}Si$ or $Li_{22}Si_5$) or alloys of germanium and lithium (for example, $Li_{4.4}Ge$). In particular, a graphitic carbon material (typically, graphite) capable of producing a large capacity can be favorably used.

Although not particularly limited, a ratio of the negative electrode active material among the entire negative electrode active material layer may normally be 50% by mass or more and typically 90% by mass or more and less than 100% by mass (for example, 95% by mass or more and 99% by mass or less).

As the binder, for example, an appropriate binder can be selected from the polymer materials exemplified as the binder for the positive electrode. In addition, while a ratio of the binder among the entire negative electrode active material layer may be appropriately selected according to a type or an amount of the negative electrode active material, for example, the ratio can be set to 1% by mass or more and 10% by mass or less (favorably, 2% by mass or more and 5% by mass or less). Furthermore, the various additives (for example, an organic compound that generates gas during an overcharge or a polymer material capable of functioning as a dispersant), the conductive materials, and the like already described above can be used as appropriate.

In a similar manner to the positive electrode, after drying the negative electrode active material slurry, a thickness or density of the negative electrode active material layer can be adjusted by performing a pressing process as appropriate. While a density of the negative electrode active material layer is not particularly limited, for example, the density may be set to 1.1 g/cm$^3$ or more (typically, 1.2 g/cm$^3$ or more; for example, 1.3 g/cm$^3$ or more) and 1.5 g/cm$^3$ or less (typically, 1.49 g/cm$^3$ or less).

Subsequently, the electrode body is fabricated by arranging the positive electrode and the negative electrode so as to oppose each other via a separator. The sealed nonaqueous electrolyte secondary battery is constructed by housing the electrode body in a suitable battery case together with a nonaqueous electrolyte (typically, a nonaqueous electrolyte that contains a supporting electrolyte in a nonaqueous solvent) and an overcharge inhibitor. Moreover, the battery case of the sealed nonaqueous electrolyte secondary battery disclosed herein is equipped with a current interrupt device as a safety mechanism.

While a shape of the electrode body is not particularly limited, for example, as schematically shown in FIG. 3, a wound electrode body 80 can be used in which an elongated positive electrode sheet 10 and an elongated negative electrode sheet 20 are laminated via separator sheets 40A and 40B and wound in a longitudinal direction.

As the separator sheets 40A and 40B, various porous sheets similar to those conventionally used in a nonaqueous electrolyte secondary battery can be used. For example, a porous resin sheet (film, nonwoven fabric, or the like) made of a polyolefin-based resin constituted by a resin such as polyethylene (PE), polypropylene (PP), polyester, cellulose, or polyamide can be used. The porous resin sheet may have a single layer structure or a multi-layered structure including two layers or more (for example, a three-layered structure in which a PP layer is laminated on both sides of a PE layer). In addition, for example, when using two or more (two in the example shown in FIG. 3) separator sheets, the separator sheets may be the same or may differ from one another. Furthermore, in the case of a sealed nonaqueous electrolyte secondary battery using a solid electrolyte (a lithium polymer battery), a configuration may be adopted in which the electrolyte doubles as a separator.

As described above, with the technique disclosed wherein, the conductive material layer can also be formed on a surface of a separator sheet instead of on a surface of the positive electrode (typically, a surface of the positive electrode active material layer). While a method of forming the conductive material layer on a separator sheet is not particularly limited, for example, the conductive material layer can be formed on a separator sheet in a similar manner to forming the conductive material layer on the positive electrode by first mixing a conductive material in a suitable solvent together with a binder and the like to prepare a slurry-like compound and then applying the slurry to a surface of a separator sheet that acts as a base. Moreover, as the conductive material, the binder, the solvent, and the like, one, two or more of the substances described earlier can be selected and used as appropriate.

As the battery case, a material or a shape conventionally used in a nonaqueous electrolyte secondary battery can be used. Examples of materials for the case include a relatively light metal material such as aluminum or steel and a resin material such as polyphenylene sulfide resin or polyimide resin. In particular, a battery case made of a relatively light metal (such as aluminum or an aluminum alloy) may be favorably adopted for reasons such as improving heat dissipation and energy density. Furthermore, a shape of the case (an external shape of the container) is not particularly limited and examples of shapes that can be adopted include a circular shape (cylindrical shape, coin shape, and button shape), a hexahedron shape (rectangular parallelepiped shape, cubic shape), a bag shape, and shapes created by processing and deforming these shapes.

The current interrupt device (CID) is not particularly limited as long as a current can be interrupted in response to a rise in pressure inside the battery case (in other words, using a rise in internal pressure as a trigger for actuation), and a mechanism similar to any of conventionally known current interrupt devices provided in batteries of this type can be adopted as appropriate. For example, a configuration shown in FIG. 2 (to be described later) can be used. In this configuration, when internal pressure of the battery case rises, members constituting a conductive path from an electrode terminal to an electrode body deform and separate from one another to interrupt the conductive path.

As the nonaqueous electrolyte, one or two or more nonaqueous electrolytes similar to those used in a conventional nonaqueous electrolyte secondary battery can be used without any particular limitation. While the nonaqueous electrolyte typically has a composition in which a supporting electrolyte (for example, lithium salt, sodium salt, magnesium salt, or potassium salt) is contained in a suitable nonaqueous solvent, the nonaqueous electrolyte may be electrolyte liquid that is become solid (typically, gelatinous) due to addition of a polymer.

As the nonaqueous solvent, an aprotic solvent such as carbonates, esters, ethers, nitriles, sulfones, or lactones can be used. Examples include ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol, dimethyl ether, ethylene glycol, diethyl ether, acetonitrile, propionitrile, nitromethane, N,N-dimethylformamide, dimethylsulfoxide, sulfolane, and γ-butyrolactone. For example, a nonaqueous solvent mainly constituted by a carbonate is favorable because a film (SEI: solid electrolyte interphase) can be preferably formed on a surface of the negative electrode active material. In particular, EC having a high relative permittivity, DMC and EMC having a high standard oxidation potential (in other words, a wide potential window), or the like can be favorably used. For example, a nonaqueous solvent may be favorably used which contains one, or two or more carbonates and in which a total volume of the carbonates is 60% by volume or more (more favorably, 75% by volume or more, even more favorably, 90% by volume or more, and may substantially be 100% by volume) with respect to the volume of the entire nonaqueous solvent.

As a supporting electrolyte, various materials known to be capable of functioning as a supporting electrolyte of a nonaqueous electrolyte secondary battery can be adopted as appropriate. For example, one, two or more supporting electrolytes selected from various lithium salts known to be capable of functioning as a supporting electrolyte of a lithium-ion secondary battery such as $LiPF_6$, $LiBF_4$, $LiClO_4$, $LiN(SO_2CF_3)_2$, $LiN(SO_2C_2F_5)_2$, $LiCF_3SO_3$, $LiC_4F_9SO_3$, $LiC(SO_2CF_3)_3$, and $LiClO_4$ can be used. In particular, $LiPF_6$ can be favorably used. While a concentration of the supporting electrolyte is not particularly limited, an excessively low concentration tends to cause a deficiency in the amount of lithium ions contained in the electrolyte and may result in a decline in ionic conductivity. On the other hand, when the concentration is excessively high, viscosity of the electrolyte tends to become too high and may result in a decline in ionic conductivity. Therefore, for example, the concentration of the supporting electrolyte is favorably set to 0.1 mol/L or more and 2 mol/L or less (favorably, 0.8 mol/L or more and 1.5 mol/L or less).

As the overcharge inhibitor, one, two or more substances used in a similar application can be used without particular limitation as long as the substances are compounds which have an oxidation potential (vs. $Li/Li^+$) that is equal to or higher than an upper limit operating voltage of a sealed nonaqueous electrolyte secondary battery (for example, 4.1 V or higher in a case of a battery that becomes fully charged at 4.1 V) and which are decomposed in an overcharged state to generate gas. Specific examples include biphenyl compounds, alkylbiphenyl compounds, cycloalkyl benzene compounds, alkyl benzene compounds, organic phosphorous compounds, fluorine atom substitutional aromatic compounds, carbonate compounds, cyclic carbamate compounds, and aromatic compounds such as alicyclic hydrocarbon. More specifically, examples include biphenyl (BP), cyclohexylbenzene (CHB), trans-butyl cyclohexylbenzene, cyclopentylbenzene, t-butylbenzene, t-aminobenzene, terphenyl, 2-fluorobiphenyl, 3-fluorobiphenyl, 4-fluorobiphenyl, 4-4'-difluorobiphenyl, o-cyclohexyl fluorobenzene, p-cyclohexyl fluorobenzene, tris-(t-butylphenyl) phosphate, phenyl fluoride, 4-fluorophenyl acetate, diphenyl carbonate, methyl phenyl carbonate, bis tertiary butyl phenyl carbonate, diphenyl ether, and dibenzofuran.

The overcharge inhibitor is favorably selected as appropriate according to an operating voltage of the battery or the like and, for example, an overcharge inhibitor with an oxidation potential that is around +0.1 V (typically, +0.2 V; for example, +0.3 V) higher than an upper limit operating voltage of the battery can be favorably selected. Furthermore, more favorably, two or more compounds with different oxidation potentials are mixed. For example, with a battery whose upper limit charging voltage is 4.1 V to 4.2 V, cyclohexylbenzene (CHB) or biphenyl (BP) with an oxidation potential (vs. Li/Li$^+$) of approximately 4.5 to 4.6 V can be favorably used. Such an overcharge inhibitor is rapidly oxidized and decomposed once the battery reaches an overcharged state (for example, 4.5 V or higher) and can generate hydrogen gas. As a result, the current interrupt device can be actuated more rapidly.

While an additive amount of the overcharge inhibitor is not particularly limited, when the additive amount is excessively small, an amount of gas generation during an overcharge decreases and creates a risk that the current interrupt device may not operate normally. On the other hand, placing too much emphasis on reliability and adding an excessive amount may cause battery performance to decline (for example, an increase in battery resistance or a degradation of cycle characteristics). Therefore, the additive amount of the overcharge inhibitor with respect to 100% by mass of the electrolyte may be set to, for example, 0.1% by mass or more (typically, 0.5% by mass or more; for example, 1% by mass or more) and 6% by mass or less (typically, 5% by mass or less; for example, 4% by mass or less, favorably, 3% by mass or less and, more favorably, 2% by mass or less). With the technique disclosed herein, a desired amount of gas can be obtained more stably as compared to conventional techniques. Therefore, the additive amount of the overcharge inhibitor can be reduced as compared to conventional techniques and both the effect of the present invention and superior battery performance can be achieved at an even higher level.

Although not particularly intended to limit the present invention, schematic configurations of the sealed nonaqueous electrolyte secondary battery according to an embodiment of the present invention will be shown in FIGS. 1 to 3 using, as an example, a sealed nonaqueous electrolyte secondary battery (cell) configured such that a flat-wound electrode body (wound electrode body) and a nonaqueous electrolyte are housed in a container with a flat rectangular parallelepiped shape (a box shape).

FIG. 1 is a perspective view schematically showing an external shape of a sealed nonaqueous electrolyte secondary battery 100 according to an embodiment of the present invention. In addition, FIG. 2 is a diagram schematically showing a sectional structure along line II-II of the sealed nonaqueous electrolyte secondary battery shown in FIG. 1.

As shown in FIGS. 1 and 2, the sealed nonaqueous electrolyte secondary battery 100 according to the present embodiment includes a wound electrode body 80 and a battery case (outer container) 50. The battery case 50 includes a battery case main body 52 with a flat rectangular parallelepiped shape (a square shape) having an open upper end, and a lid body 54 that blocks the opening thereof. A positive electrode terminal 70 which is electrically connected to a positive electrode sheet of the wound electrode body 80 and a negative electrode terminal 72 which is electrically connected to a negative electrode sheet of the electrode body are provided on an upper surface (in other words, the lid body 54) of the battery case 50. In addition, the lid body 54 is provided with a safety valve 55 for discharging gas generated inside the battery case to the outside of the case in a similar manner to a battery case of a conventional nonaqueous electrolyte secondary battery. The safety valve 55 is typically configured so as to open under pressure that equals or exceeds an operating pressure of a current interrupt device 30.

The electrode body (wound electrode body) 80 configured such that an elongated positive electrode sheet 10 and an elongated negative electrode sheet 20 are flatly wound via separator sheets 40A and 40B is housed inside the battery case 50 together with a nonaqueous electrolyte (not shown). As shown in FIG. 3, the positive electrode sheet 10 is formed such that a positive electrode active material layer 14 (and the conductive material layer 16) are not provided (or have been removed) and a positive electrode current collector 12 is exposed at one longitudinal end of the positive electrode sheet 10. In a similar manner, the wound negative electrode sheet 20 is formed such that a negative electrode active material layer 24 is not provided (or have been removed) and a negative electrode current collector 22 is exposed at one longitudinal end of the negative electrode sheet 20. In addition, as shown in FIG. 2, a positive electrode current collecting plate 74 is attached to the exposed end of the positive electrode current collector 12 and a negative electrode current collecting plate 76 is attached to the exposed end of the negative electrode current collector 22 and are respectively electrically connected to the positive electrode terminal 70 and the negative electrode terminal 72.

Furthermore, the current interrupt device 30 that is actuated in response to a rise in internal pressure of the battery case is provided inside the battery case 50. The current interrupt device 30 need only be configured so as to interrupt a conductive path (for example, a charging path) from at least one electrode terminal to the electrode body 80 when the internal pressure of the battery case 50 rises and is not limited to a particular shape. In the embodiment shown in FIG. 2, the current interrupt device 30 is provided between the positive electrode terminal 70 fixed to the lid body 54 and the electrode body 80 and is configured to interrupt a conductive path from the positive electrode terminal 70 to the electrode body 80 when the internal pressure of the battery case 50 rises.

More specifically, for example, the current interrupt device 30 includes a first member 32 and a second member 34. A configuration is adopted such that when the internal pressure of the battery case 50 rises, at least one of the first member 32 and the second member 34 deforms and separates from the other to interrupt the conductive path. In the embodiment shown in FIG. 2, the first member 32 is a deformed metal plate and the second member 34 is a connecting metal plate that is bonded to the deformed metal plate 32. The deformed metal plate (first member) 32 has an arched shape with a center portion that is bent downward, and a peripheral portion thereof is connected to a lower surface of the positive electrode terminal 70 via a current collector lead terminal 35. In addition, a tip of a bent portion 33 of the deformed metal plate 32 is bonded to an upper surface of the connecting metal plate 34. The positive electrode current collecting plate 74 is bonded to a lower surface (rear surface) of the connecting metal plate 34, and the positive electrode current collecting plate 74 is connected to the positive electrode 10 of the electrode body 80. In this manner, a conductive path from the positive electrode terminal 70 to the electrode body 80 is formed.

In addition, the current interrupt device 30 includes an insulating case 38 formed using plastic or the like. The insulating case 38 is provided so as to enclose the deformed metal plate 32 and hermetically seals an upper surface of the deformed metal plate 32. Internal pressure of the battery case 50 does not act on an upper surface of the hermetically sealed bent portion 33. In addition, the insulating case 38 has an opening into which the bent portion 33 of the deformed metal plate 32 is fitted. A lower surface of the bent portion 33 is exposed from the opening toward the inside of the battery case 50. The internal pressure of the battery case 50 acts on the lower surface of the bent portion 33 that is exposed toward the inside of the battery case 50. With the current interrupt device 30 configured as described above, when the internal pressure of the battery case 50 rises, the internal pressure acts on the lower surface of the bent portion 33 of the deformed metal plate 32 and the bent portion 33 that is bent downward is now pushed upward. The upward push on the bent portion 33 increases in intensity as the internal pressure of the battery case 50 rises. Subsequently, when the internal pressure of the battery case 50 exceeds a set pressure, the bent portion 33 is inverted upside down and deforms so as to bend upward. Due to this deformation of the bent portion 33, a bonding point 36 between the deformed metal plate 32 and the connecting metal plate 34 is interrupted. Consequently, the conductive path from the positive electrode terminal 70 to the electrode body 80 is interrupted and an overcharge current is blocked.

Moreover, a position of the current interrupt device 30 is not limited to the positive electrode terminal 70 and the current interrupt device 30 may be provided on the negative electrode terminal 72. In addition, the current interrupt device 30 is not limited to mechanical interruption that is accompanied with a deformation of the deformed metal plate 32 described above. For example, an external circuit which detects the internal pressure of the battery case 50 with a sensor and which interrupts a charge current when the internal pressure as detected by the sensor exceeds a set pressure may be provided as a current interrupt device.

FIG. 3 is a diagram schematically showing an elongated sheet structure (electrode sheet) at a stage prior to assembling the wound electrode body 80. The wound electrode body 80 with such a flat shape can be fabricated by laminating the positive electrode sheet 10 in which the positive electrode active material layer 14 (and the conductive material layer 16) are formed in a longitudinal direction on one surface or both surfaces (typically, both surfaces) of the elongated positive electrode current collector 12 and the negative electrode sheet 20 in which the negative electrode active material layer 24 is formed in a longitudinal direction on one surface or both surfaces (typically, both surfaces) of the elongated negative electrode current collector 22 together with elongated separators 40A and 40B, winding the lamination in a longitudinal direction, and then squashing and collapsing the lamination in a lateral direction. Since a battery including a wound electrode body is high in capacity among nonaqueous electrolyte secondary batteries, improving reliability is especially important. According to the technique disclosed herein, the reliability of the battery (for example, actuating performance of a current interrupt device during an overcharge) can be further improved as compared to conventional batteries.

FIG. 5 shows an assembled battery (typically, an assembled battery constructed by connecting a plurality of cells in series and/or in parallel) 200 constituted by a plurality of the sealed nonaqueous electrolyte secondary batteries (hereinafter, also simply referred to as "cells") 100 described above. In the assembled battery 200 shown in FIG. 5, a plurality (typically, 10 or more and, favorably, around 10 to 30; for example, 20) of the sealed nonaqueous electrolyte secondary batteries (cells) 100 are aligned in a direction in which a large width surface of the battery case 50 oppose each other (a direction of lamination) by inverting each sealed nonaqueous electrolyte secondary battery (cell) 100 so that respective positive electrode terminals 70 and negative electrode terminals 72 are alternately arranged. In addition, a cooling plate 110 with a predetermined shape is inserted between the aligned cells 100. The cooling plates 110 function as heat radiating members for efficiently dissipating heat generated in each of the cells 100 during use, and favorably have a shape that enables a cooling fluid (typically, air) to be introduced between the cells 100 (for example, a shape in which a plurality of parallel grooves are provided on the surfaces of rectangular cooling plates from one side of the cooling plates in the lengthwise direction thereof to the opposing side extending vertically there from). The cooling plates are preferably made from a metal having favorable thermal conductivity or from polypropylene or other synthetic resins that are both lightweight and hard.

A pair of end plates (constraining plates) 120 is arranged at both ends of the aligned cells 100 and cooling plates 110. In addition, one or a plurality of sheet-like spacer members 150 as length adjusting means may be inserted between the cooling plates 110 and the end plates 120. The aligned cells 100, cooling plates 110, and spacer members 150 are constrained so that predetermined constraining pressure is applied in the direction of lamination by a constraining band 130 for fastening which is attached so as to bridge between both end plates. More specifically, by fastening and fixing an end of the constraining band 130 to the end plate 120 with a screw 155, the cells and the like are constrained so that predetermined constraining pressure is applied in the direction of alignment. Accordingly, the constraining pressure is also applied to the wound electrode body 80 that is housed in the battery case 50 of each cell 100. In addition, between adjacent cells 100, the positive electrode terminal 70 of a first cell and the negative electrode terminal 72 of a second cell are electrically connected to each other by a connecting member (bus bar) 140. As a result of connecting each of the cells 100 in series in this manner, the assembled battery 200 is constructed so as to have a desired voltage.

While the sealed nonaqueous electrolyte secondary battery disclosed herein can be used in various applications, the sealed nonaqueous electrolyte secondary battery features improved reliability as compared to conventional batteries without sacrificing high battery performance. Therefore, the sealed nonaqueous electrolyte secondary battery can be particularly preferably used in applications that require high capacity and/or high output. Examples of such applications include a power source (a driving power supply) for a motor which is mounted to a vehicle 1 such as that shown in FIG. 6. While a type of the vehicle 1 is not particularly limited, examples include a plug-in hybrid vehicle (PHV), a hybrid vehicle (HV), an electric vehicle (EV), an electric truck, an integrated wheel, an electrically assisted bicycle, and an electric wheelchair. Moreover, while the assembled battery 200 constructed by connecting a plurality of the cells 100 in series and/or in parallel has been used herein, it is obvious that the cell 100 can also be used independently.

Hereinafter, as specific examples, an evaluation was conducted to determine whether or not a difference occurs in the amount of gas that is generated during an overcharge according to the method disclosed herein. Moreover, the following description is not intended to limit the present invention to the specific examples below.

[Construction of Sealed Nonaqueous Electrolyte Secondary Battery]

Examples 1 to 11

$LiNi_{1/3}Co_{1/3}Mn_{1/3}O_2$ (NCM) as a positive electrode active material powder, acetylene black (AB) as a conductive material, and polyvinylidene fluoride (PVdF) as a binder were placed in a kneader at a mass ratio of NCM: AB:PVdF=93:4:3, and a positive electrode active material slurry was prepared by kneading the mixture while adjusting viscosity using N-methylpyrrolidone (NMP) so as to attain a solid content concentration (NV) of 50% by mass. A positive electrode active material layer was formed by applying the slurry to aluminum foil (a positive electrode current collector) with a thickness of 15 μm and drying the slurry. Next, a positive electrode conductive material slurry was prepared by mixing graphite (C) as a conductive material and polyvinylidene fluoride (PVdF) with N-methylpyrrolidone (NMP) at a mass ratio of C:PVdF=90:10 so as to attain a solid content concentration (NV) of 50% by mass. A conductive material layer was formed by applying the slurry on the formed positive electrode active material layer and then drying the slurry. By roll-pressing the positive electrode obtained in this manner and varying the pressure of pressing, positive electrodes (Examples 1 to 11) with different porosities (%) and densities (g/cm³) of the conductive material layer were fabricated. Subsequently, the porosities (%) of the fabricated conductive material layers were measured by the method already described above. Results thereof are shown in Table 1.

Next, natural graphite (C) as a negative electrode active material, styrene butadiene rubber (SBR) as a binder, and carboxymethyl cellulose (CMC) as a dispersant were placed in a kneader at a mass ratio of C:SBR:CMC=98:1:1, and a negative electrode active material slurry was prepared by kneading the mixture while adjusting viscosity using deionized water so as to attain a solid content concentration (NV) of 45% by mass. A negative electrode active material layer was formed by applying the slurry to an elongated copper foil (negative electrode current collector) with a thickness of 10 μm and then drying the slurry. A negative electrode was fabricated by roll-pressing the obtained negative electrode.

The positive electrode and the negative electrode fabricated as described above were arranged so as to oppose each other via a separator (in this case, a separator with a three-layered structure in which PP layers are laminated on both sides of a PE layer was used) to fabricate an electrode body. The electrode body was housed in a laminate sheet together with a nonaqueous electrolyte (in this case, electrolyte liquid was used which had been created by dissolving $LiPF_6$ as an electrolyte at a concentration of 1 mol/L in a mixed solvent containing ethylene carbonate (EC), dimethyl carbonate (DMC), and ethyl methyl carbonate (EMC) at a volume ratio of 3:4:3 and further including cyclohexylbenzene (CHB) at a concentration of 3% by mass) to construct laminate sheet type nonaqueous electrolyte secondary batteries (Examples 1 to 11). Moreover, for Examples 3 to 10, two batteries (in other words, N=2) were respectively used.

Example 12

In the present example, the positive electrode (Example 12) was fabricated in a similar manner to Example 1 with the exception of not applying a conductive material layer when fabricating the positive electrode. A laminate sheet type nonaqueous electrolyte secondary battery (Example 12) was constructed using the positive electrode.

[Overcharge Test (Measurement of Amount of Generated Gas)]

After performing appropriate conditioning at 25° C. on the constructed laminated nonaqueous electrolyte secondary battery (Examples 1 to 12), a volume of the cell was measured using Archimedes' method. Archimedes' method refers to a method of calculating a volume of a measurement object (in the present example, a laminated nonaqueous electrolyte secondary battery) by immersing the measurement object in a liquid medium (for example, distilled water or alcohol) and measuring buoyancy that acts on the measurement object.

Subsequently, the battery was charged with a constant current at a rate of 1 C until an overcharge state was reached (in the present example, a state where SOC reached 160%) in a 25° C. environment, and the volume of the cell was once again measured using Archimedes' method. Subsequently, the volume (B(cm³)) of the cell prior to overcharge was subtracted from the volume (A(cm³)) of the cell after overcharge to calculate an amount of generated gas (A–B (cm³)) during the overcharge. The value was divided by a capacity (Ah) of the battery to calculate an amount of generated gas per unit capacity (cm³/Ah). Results thereof are shown in FIG. 7.

As shown in FIG. 7, the amount of generated gas in Example 12 in which a conductive material layer had not been formed was less than 20 cm³/Ah. In comparison, an increase in the amount of generated gas was observed in Examples 1 to 11 in which a conductive material layer had been formed. This is conceivably because the presence of the conductive material layer had caused an increase in an area (reaction field) where a reaction of the overcharge inhibitor may occur and, as a result, the overcharge inhibitor had oxidized and decomposed in a stable manner. In particular, with the batteries according to Examples 3 to 10 in which the porosity of the conductive material layer ranged from 35% or more and 55% or less, a significant increase in the amount of generated gas by a factor of approximately 2

TABLE 1

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Porosity (%) | 26.7 | 31.9 | 36.5 | 40.4 | 45.5 | 49.8 | 51.0 | 52.6 | 53.5 | 54.6 | 56.7 | to 2.5 was observed as compared to the battery according to Example 12 which did not include a conductive material layer. In other words, the batteries according to Examples 3 to 10 were capable of generating gas during an overcharge at 40 cm$^3$/Ah or more (typically, 40 cm$^3$/Ah to 65 cm$^3$/Ah, for example, 45 cm$^3$/Ah to 55 cm$^3$/Ah, and particularly 50 cm$^3$/Ah or more). By setting the porosity of the conductive material layer to 35% or more, preferable gaps are maintained in the conductive material layer and an electrolyte and an overcharge inhibitor can sufficiently infiltrate the conductive material layer. On the other hand, by setting the porosity of the conductive material layer to 55% or less, a conductive path within the conductive material layer can be preferably maintained and an increase in resistance can be suppressed. Therefore, a decomposition reaction of the overcharge inhibitor takes place rapidly in the conductive material layer and a large amount of gas can be generated. Furthermore, since the results of tests performed for N=2 revealed approximately equivalent values, the tests demonstrate that a decomposition reaction of the overcharge inhibitor takes place rapidly with high reproducibility in the conductive material layer and a large amount of gas can be generated in a steady manner.

As described above, by providing a conductive material layer which satisfies the described porosity range between the positive electrode active material layer and the separator (typically, on an outermost surface of the positive electrode), the generated amount of decomposition gas during an overcharge can be increased. This result supports the technical significance of the sealed nonaqueous electrolyte secondary battery disclosed herein.

While specific examples of the present invention have been described in detail, such specific examples are merely illustrative and are not intended to limit the scope of claims. Techniques described in the scope of claims include various modifications and changes made to the specific examples illustrated above.

INDUSTRIAL APPLICABILITY

While the sealed nonaqueous electrolyte secondary battery disclosed herein can be used in various applications, a feature of the sealed nonaqueous electrolyte secondary battery is that both high reliability and superior battery performance are achieved. Therefore, the sealed nonaqueous electrolyte secondary battery can be preferably used in applications that require high energy density and high output density. Examples of such applications include a power source (a driving power supply) for motor drive which is mounted to a vehicle (typically, a plug-in hybrid vehicle (PHV), a hybrid vehicle (HV), or an electric vehicle (EV)).

REFERENCE SIGNS LIST

1 Automobile (vehicle)
10 Positive electrode sheet (positive electrode)
12 Positive electrode current collector
14 Positive electrode active material layer
15 Intermediate layer
16 Conductive material layer
20 Negative electrode sheet (negative electrode)
22 Negative electrode current collector
24 Negative electrode active material layer
30 Current interrupt device
32 Deformed metal plate (first member)
34 Connecting metal plate (second member)
38 Insulating case
40A, 40B Separator sheet
50 Battery case
52 Case main body
54 Lid body
55 Safety valve
70 Positive electrode terminal
72 Negative electrode terminal
74 Positive electrode current collecting plate
76 Negative electrode current collecting plate
80 Wound electrode body
90 Flat plate
100 Sealed nonaqueous electrolyte secondary battery
110 Cooling plate
120 End plate
130 Constraining band
140 Connecting member
150 Spacer member
155 Screw
200 Assembled battery

The invention claimed is:

1. A sealed nonaqueous electrolyte secondary battery in which an electrode body having a positive electrode and a negative electrode that oppose each other via a separator, an electrolyte, and an overcharge inhibitor made of a compound that generates gas when a prescribed battery voltage is exceeded are housed in a battery case, this sealed nonaqueous electrolyte secondary battery including a current interrupt device that is actuated when pressure inside the battery case rises as a result of generation of the gas, wherein
the positive electrode includes a positive electrode current collector and a positive electrode active material layer disposed on the positive electrode current collector
the positive electrode active material layer mainly contains a positive electrode active material,
the positive electrode also includes a conductive material layer which mainly contains a conductive material,
the conductive material layer defines an outermost surface of the positive electrode located between the positive electrode active material layer and the separator, the conductive material is at least one of conductive carbon materials,
the positive electrode active material is at least one of compounds containing lithium and a transition metal element,
the conductive material layer has a porosity of 35% or higher and 55% or lower,
the overcharge inhibitor is infiltrated into the conductive material layer,
the sealed nonaqueous electrolyte secondary battery is configured to generate the gas in an amount necessary for operating the current interrupt device when the prescribed battery voltage is exceeded, and
an average particle diameter of the conductive carbon materials is 5 μm or more and 15 μm or less.

2. The sealed nonaqueous electrolyte secondary battery according to claim 1, wherein the positive electrode has a two-layered structure including the positive electrode active material layer disposed on the positive electrode current collector and the conductive material layer disposed on a surface of at least a part of the positive electrode active material layer.

3. The sealed nonaqueous electrolyte secondary battery according to claim 1, wherein a specific surface area of the conductive material as measured by a nitrogen gas adsorption method is 1 m$^2$/g or more and 30 m$^2$/g or less.

4. The sealed nonaqueous electrolyte secondary battery according to claim 1, wherein the conductive material includes at least graphite.

5. The sealed nonaqueous electrolyte secondary battery according to claim 1, wherein the overcharge inhibitor includes cyclohexylbenzene and/or biphenyl.

6. The sealed nonaqueous electrolyte secondary battery according to claim 1, wherein the overcharge inhibitor is in an amount of 0.5% by mass or more and 5% by mass or less with respect to 100% by mass of the electrolyte.

7. An assembled battery comprising a plurality of the sealed nonaqueous electrolyte secondary batteries according to claim 1.

8. A vehicle equipped with the assembled battery according to claim 7 as a driving power supply.

9. The sealed nonaqueous electrolyte secondary battery according to claim 1, wherein the conductive material layer does not contain the positive electrode active material.

10. The sealed nonaqueous electrolyte secondary battery according to claim 9, wherein the conductive material layer further includes a binder.

* * * * *